United States Patent
Emami et al.

(10) Patent No.: US 7,933,343 B2
(45) Date of Patent: Apr. 26, 2011

(54) ENHANCED OFDM BY USE OF ALTERNATING POLARIZATION STATES

(75) Inventors: Shahriar Emami, Royal Palm Beach, FL (US); Celestino Corral, Lake Worth, FL (US); Gregg Rasor, Lantana, FL (US); Salvador Sibecas, Lake Worth, FL (US); Glafkos Stratis, Lake Worth, FL (US)

(73) Assignee: Motorola Mobility, Inc., Libertyville, IL (US)

( * ) Notice: Subject to any disclaimer, the term of this patent is extended or adjusted under 35 U.S.C. 154(b) by 1328 days.

(21) Appl. No.: 10/331,696

(22) Filed: Dec. 30, 2002

(65) Prior Publication Data
US 2004/0125880 A1    Jul. 1, 2004

(51) Int. Cl.
*H04K 1/10* (2006.01)
(52) U.S. Cl. ........ 375/260; 375/267; 375/295; 375/307; 370/430; 370/208; 370/203; 370/210
(58) Field of Classification Search ............... 375/260, 375/299, 267, 295; 370/208, 203, 210
See application file for complete search history.

(56) References Cited

U.S. PATENT DOCUMENTS

| | | | | |
|---|---|---|---|---|
| 4,811,021 A * | 3/1989 | Yoshimoto et al. | ........... | 342/361 |
| 5,764,696 A | 6/1998 | Barnes et al. | | |
| 6,201,785 B1 * | 3/2001 | Fouche et al. | ............. | 370/203 |
| 6,327,314 B1 | 12/2001 | Cimini, Jr. et al. | ........... | 375/340 |
| 6,347,234 B1 | 2/2002 | Scherzer | | |
| 6,442,214 B1 * | 8/2002 | Boleskei et al. | .............. | 375/299 |
| 6,621,463 B1 | 9/2003 | Lam | | |
| 2002/0018483 A1 | 2/2002 | Kuwabara et al. | ............ | 370/430 |
| 2002/0191535 A1 * | 12/2002 | Sugiyama et al. | ............ | 370/208 |
| 2005/0190853 A1 * | 9/2005 | Tirkkonen | ................. | 375/295 |

FOREIGN PATENT DOCUMENTS

EP      0 831 627 A2   3/1998

OTHER PUBLICATIONS

Zhuang et al.; Data Transmission and Reception Method and Apparatus; Pub Date: Jul. 3, 2003.*
Giannakis et al.; Space-Time Doppler Coding Schemes for Time-Selective Wireless Communication Channels.*

* cited by examiner

*Primary Examiner* — Eva Y Puente

(57) ABSTRACT

An Orthogonal Frequency Division Multiplexer (OFDM) transmitter and receiver apparatus consistent with certain embodiments of the present invention receives data to be transmitted and maps (204) a first portion of the data to a first polarization state and a second portion of the data to a second polarization state. A first transmitter (216) transmits the first portion of the data as a set of first OFDM subcarriers using an antenna (230) exhibiting a first polarization. A second transmitter (234) transmits the second portion of the data as a set of second OFDM subcarriers using an antenna (240) exhibiting a second polarization, wherein the first polarization is orthogonal to the second polarization. A receiver apparatus uses a first antenna (302) exhibiting the first polarization and a second antenna (306) exhibiting the second polarization. A first OFDM receiver (310) receives a first set of polarized OFDM subcarriers from the first antenna (302) while a second OFDM receiver (324) receives a second set of polarized OFDM subcarriers from the second antenna (306). A decoder (330) decodes the first and second sets of OFDM subcarriers and combines them into a stream of data.

9 Claims, 6 Drawing Sheets

ENHANCED OFDM BY USE OF ALTERNATING POLARIZATION STATES

FIELD OF THE INVENTION

This invention relates generally to the field of orthogonal frequency division multiplexing (OFDM). More particularly, this invention relates to an enhancement of OFDM using polarization states.

BACKGROUND OF THE INVENTION

OFDM has become widely accepted as a modulation mechanism and was adopted for the IEEE 802.11a modulation standard. However, there are a number of known drawbacks to OFDM. One disadvantage is that conventional OFDM inherently exhibits a large peak to average power ratio (PAPR). The PAPR of an OFDM system is given by 10 log(N) where N is the number of subcarriers. Thus, for a 64 subcarrier system, the PAPR≈18 dB. Due to this large variation from peak to average that must be accommodated, an OFDM transmitter generally requires a linear amplifier. Since linear amplifiers are less efficient in transmission of signals with a large PAPR, power is often wasted. This can be a significant concern in battery-powered equipment.

A second known drawback with OFDM systems is that as the number of subcarriers increases, for a given bandwidth, the requirements on oscillator phase noise increases. Such oscillators generally have requirements for a low variation in oscillator frequency (over all operational conditions) and a low level of phase noise. These restrictions can place lower limits on the cost of the oscillator circuitry.

A third known drawback with OFDM systems is that inter-carrier interference (ICI) is easily introduced as a result of Doppler effects caused by movement of the transmitter, receiver or objects in the surrounding environment.

BRIEF DESCRIPTION OF THE DRAWINGS

The features of the invention believed to be novel are set forth with particularity in the appended claims. The invention itself however, both as to organization and method of operation, together with objects and advantages thereof, may be best understood by reference to the following detailed description of the invention, which describes certain exemplary embodiments of the invention, taken in conjunction with the accompanying drawings in which:

DETAILED DESCRIPTION OF THE INVENTION

Figure 1:
FIG. 1 illustrates a frequency spectrum for an OFDM signal.

While this invention is susceptible of embodiment in many different forms, there is shown in the drawings and will herein be described in detail specific embodiments, with the understanding that the present disclosure is to be considered as an example of the principles of the invention and not intended to limit the invention to the specific embodiments shown and described. In the description below, like reference numerals are used to describe the same, similar or corresponding elements in the several views of the drawings.

The terms "a" or "an", as used herein, are defined as one or more than one. The term "plurality", as used herein, is defined as two or more than two. The term "another", as used herein, is defined as at least a second or more. The terms "including" and/or "having", as used herein, are defined as comprising (i.e., open language). The term "coupled", as used herein, is defined as connected, although not necessarily directly, and not necessarily mechanically. The term "program", as used herein, is defined as a sequence of instructions designed for execution on a computer system. A "program", or "computer program", may include a subroutine, a function, a procedure, an object method, an object implementation, in an executable application, an applet, a servlet, a source code, an object code, a shared library/dynamic load library and/or other sequence of instructions designed for execution on a computer system. The term "orthogonal" as used herein is intended to embrace not only true orthogonallity, but also to embrace quasi-orthogonallity. The terms "horizontal polarization" and "vertical polarization" as used herein is not to be construed strictly as meaning horizontal and vertical with respect to the earth's horizon, but rather to mean parallel and normal (perpendicular) to any arbitrary reference plane in three-dimensional space.

To understand how polarization is utilized in a manner consistent with the present invention, first consider FIG. 1, which illustrates a more or less conventional output spectrum for twelve subcarriers (SC0-SC11) of an OFDM system. While it is noted that the spectral output of each subcarrier will resemble a sin(x)/x (i.e., a sinc) function, in order to simplify the illustration only the dominant portion of the sinc function extending in each direction from the center frequency to the first zero crossing is illustrated. The alignment of the peak of the sinc function of a subcarrier with the nulls of the adjacent subcarriers produces the orthogonallity from which OFDM is named.

Figure 2:
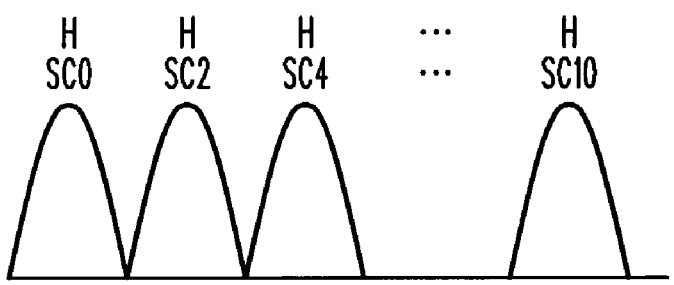
FIG. 2 illustrates a segment of frequency spectrum representing a horizontally polarized output signal for an OFDM system consistent with certain embodiments of the present invention.
Figure 3:
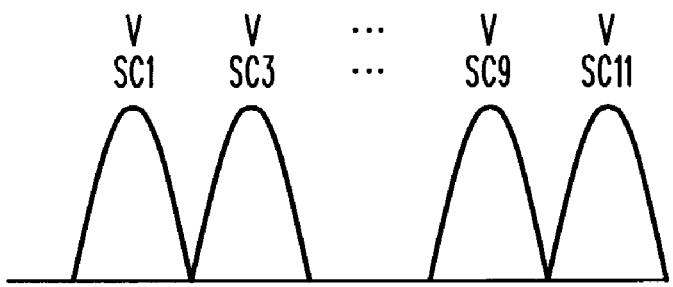
FIG. 3 illustrates a segment of frequency spectrum representing a vertically polarized output signal for an OFDM system consistent with certain embodiments of the present invention.
Figure 4:
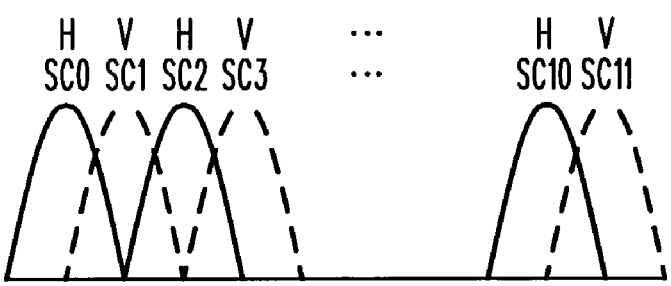
FIG. 4 illustrates a segment of frequency spectrum representing a composite of the horizontally and vertically polarized output signal for an OFDM system consistent with certain embodiments of the present invention.

Now consider FIG. 2 and FIG. 3 which depict separation of the spectrum of FIG. 1 into two halves with alternating subcarriers occupying each half. Certain embodiments consistent with the present invention seek to do so and provide an additional level of encoding to each half. By separately transmitting each half of the spectrum of FIG. 1 as the spectra illustrated in FIG. 2 and FIG. 3, each half can be transmitted using antennas which produce polarizations which are orthogonal by, for example, horizontally polarizing one half and vertically polarizing the other half. In this illustration, the spectrum of FIG. 2 is transmitted as horizontally polarized signals while the spectrum of FIG. 3 is transmitted as vertically polarized signals. The composite transmission is illustrated in FIG. 4.

Thus, in an OFDM system consistent with certain embodiments of the present invention, a first transmitter transmits a set of horizontally polarized OFDM subcarriers while a second transmitter transmits a set of vertically polarized OFDM subcarriers. The horizontally polarized OFDM subcarriers are separated in frequency by a specified frequency spacing, and the vertically polarized OFDM subcarriers are also separated by the same frequency spacing. The horizontally polarized OFDM subcarriers are interleaved in frequency with the vertically polarized OFDM subcarriers.

The above arrangement results in a new version of OFDM modulation that takes advantage of polarization states. When two polarization states are used in an arrangement in which alternating subcarriers use alternating polarization states, the process is referred to herein as Alternating Dual Polarization States (ADPS)-OFDM. A system for generating such modulation is comparable in terms of computational complexity to OFDM. However, this OFDM modulation scheme has advantages over the conventional OFDM in at least four ways. First, the peak-to-average power associated with ADPS-OFDM is 3 dB lower compared to that of conventional OFDM. Secondly, ADPS-OFDM can operate with a less expensive frequency synthesizer. Thirdly, an ADPS-OFDM system is less sensitive to inter-carrier interference (ICI) caused by Doppler spread. Fourthly, ADPS-OFDM provides an additional level (or levels) of interleaving by alternating in frequency, time and/or polarization.

Ideally, a set of signals which are transmitted as with a pair of antennas that are orthogonally polarized produce signals which could only be received by antennas with the same polarization. While two orthogonally polarized signals are illustrated, this should not be considered limiting since multiple orthogonal or quasi-orthogonal signals could also be used. A signal with the wrong polarization would (ideally) be 100% attenuated due to the orthogonallity of the polarization. Of course, due to reflections and other real world conditions, such 100% isolation is impossible to achieve. It is also the case that multiple polarizations which are quasi-orthogonal may be used to produce isolation between subcarriers in other embodiments of the invention, where polarizations may be considered quasi-orthogonal if they result in attenuations which are not 100%, but some useable percentage thereof (e.g., 70%, 50%, 80%, etc. depending upon the application). For purposes of this invention, the term quasi-orthogonal is encompassed within the term orthogonal.

While ADPS-OFDM is used as an exemplary embodiment herein, it should be noted that the invention is not limited to arrangements in which alternating subcarriers use two alternating polarization states. Multiple orthogonal or quasi-orthogonal polarization states (two or more) can be used and applied to any suitable arrangement of subcarriers (alternating or otherwise) without departing from the present invention. Additionally, the polarization states in adjacent symbols can also be alternated to produce yet another layer of interleaving.

In this exemplary ADPS-OFDM modulation scheme one OFDM sub-channel is horizontally polarized while the second sub-channel is vertically polarized. The alternating vertical and horizontal polarization assignment among sub-channels is repeated until all OFDM sub-channels are covered, as described above. However, it is noted that other embodiments consistent with the present invention can combine polarization states with OFDM without strictly complying with the alternation scheme of this example without departing from the present invention.

Figure 5:
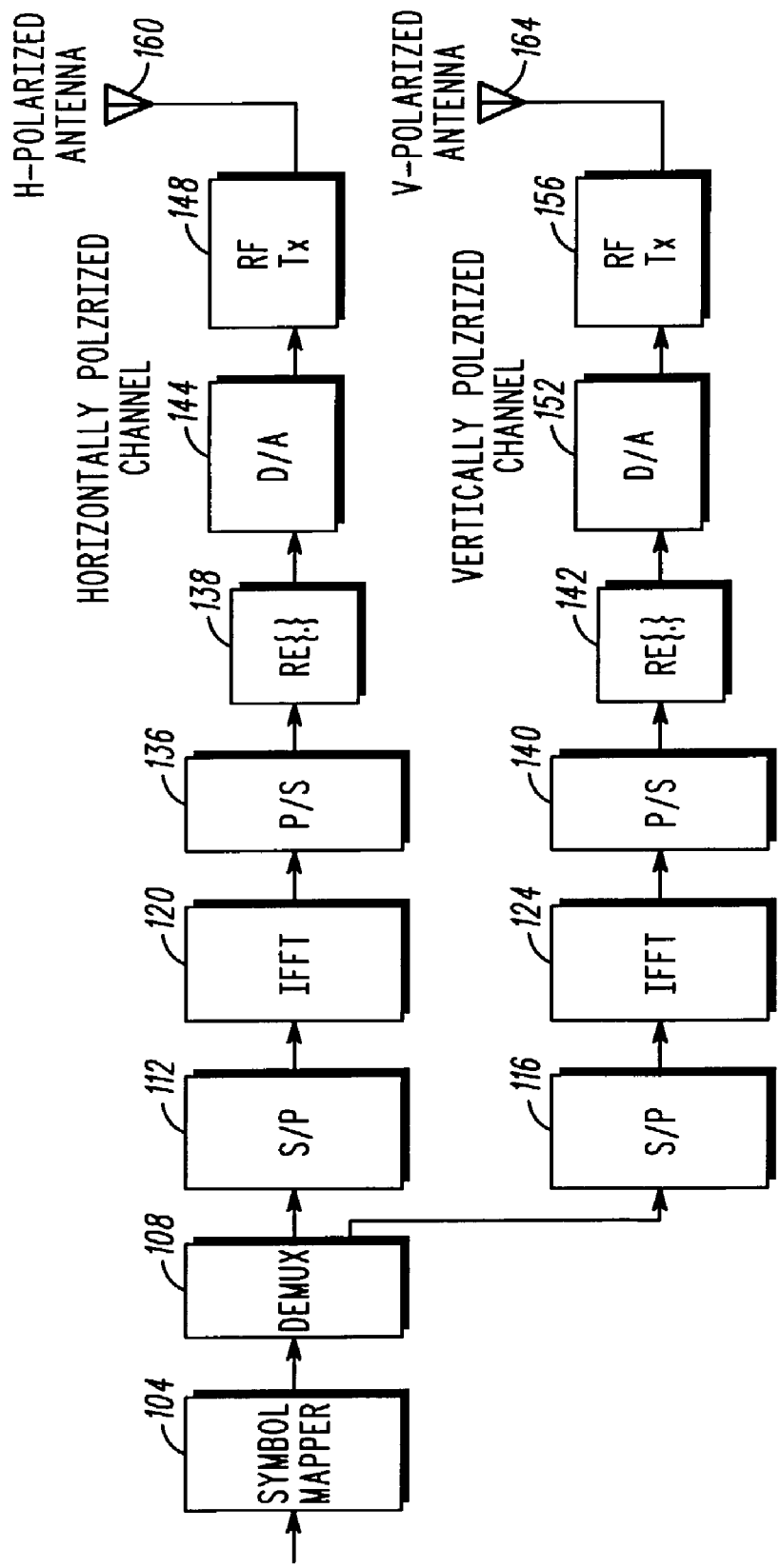
FIG. 5 is a block diagram of an illustrative Alternating Dual Polarization States (ADPS)-OFDM transmitter system consistent with certain embodiments of the present invention.

A block diagram for one implementation of an ADPS-OFDM transmitter consistent with certain embodiments of the present invention is shown in FIG. 5. This transmitter structure is similar to that of conventional OFDM transmitters except that there are two branches in the transmitter. The upper branch processes a channel which will be transmitted with horizontal polarization and the lower branch processes a channel which will be transmitted with vertical polarization.

With reference to system 100 of FIG. 5, it is noted that for applications involving transmission of analog signals such as speech and video, additional circuitry can be used to convert from analog signals to digital signals and vice versa, as will be understood by those skilled in the art. Incoming data to be transmitted may be encoded by a channel encoder (e.g., such as a convolutional encoder—not shown) to add redundancy to the data to facilitate error detection and correction. The encoded data can then be passed to an interleaver (not shown) which rearranges the data to help assure that errors introduced during transmission are spread out to avoid multiple errors in adjacent data bits (which are more difficult or impossible to correct). The output of the interleaver is coupled to a binary to complex symbol mapper such as symbol mapper 104 that maps data bits to symbols on a complex two-dimensional plane. The data can be encoded as any suitable collection of symbols, for example, QAM, binary phase shift keying (BPSK) data, quadrature phase shift keying (QPSK), sixteen symbol quadrature amplitude modulation (16QAM) or sixty four symbol quadrature amplitude modulation (64QAM).

A collection of symbols are split into two paths by demultiplexer 108 and rearranged from serial data to parallel data at serial to parallel converter (S/P) 112 in the upper path and 116 in the lower path. The parallel data symbols from S/P are coupled as inputs to an inverse Fast Fourier Transformer (IFFT) 120 in the upper path and 124 in the lower path. The IFFT function can be implemented using a programmed digital signal processor (DSP). This produces a signal which is an inverse FFT of the collection of symbols provided at the input and effectively represents a collection of simultaneous sub-carriers. After conversion back to a serial data stream at parallel to serial converters 136 in the upper path and 140 in the lower path, the real part of the IFFT is taken at 138 in the upper path and 142 in the lower path respectively. The data from blocks 138 and 140 are respectively passed to a digital to analog converter (DAC or D/A) 144 and radio frequency (RF) transmitter circuit 148 in the upper path and D/A 152 and RF transmitter circuit 156 in the lower path respectively. Circuits 148 and 156 modulate the subcarriers to a desired frequency band for transmission. In the upper path, the modulated subcarriers are transmitted over a horizontally polarized antenna 160. In the lower path, the modulated subcarriers are transmitted over a vertically polarized antenna 160.

The process carried out in this system can be characterized mathematically as follows:

Let $x(n) = \{x(0)\ x(1)\ x(2)\ \ldots\ x(N-1)\} = \{d_0 e^{ij0}\ d_1 e^{ij1}\ d_2 e^{ij2}\ \ldots\ d_{N-1} e^{ij(N-1)}\}$ denote a block of N QAM symbols. Decompose x into $x' = \{x(0)\ 0\ x(2)\ 0\ \ldots\ x(N-1)\ 0\}$ and $x'' = \{0\ x(1)\ 0\ x(3)\ \ldots\ 0\ x(N)\}$ and utilize these two blocks as inputs to lower and upper IFFT blocks. The complex signals at the output of the IFFT block are given as $$X_U(n) = \frac{1}{\sqrt{N}} \sum_{k=0}^{N-1} x'(k) e^{\frac{j \cdot 2\pi \cdot k \cdot n}{N}} \text{ and} \quad \text{Equation 1}$$

$$X_L(n) = \frac{1}{\sqrt{N}} \sum_{k=0}^{N-1} x''(k) e^{\frac{j \cdot 2\pi \cdot k \cdot n}{N}} \quad \text{Equation 2}$$

where the subscript k represents a subcarrier frequency, N is equal to the number of sub-carriers, and the parameter n represents discrete time. The resulting signals at the output of the Re { } operators are $$R_U(n) = \frac{1}{\sqrt{N}} \sum_{k=0, k \text{ even}}^{N-1} d_k \cos\left(\frac{2\pi \cdot k \cdot n}{N} + \theta_k\right) \text{ and} \quad \text{Equation 3}$$

$$R_L(n) = \frac{1}{\sqrt{N}} \sum_{k=0, k \text{ odd}}^{N-1} d_k \cos\left(\frac{2\pi \cdot k \cdot n}{N} + \theta_k\right) \quad \text{Equation 4}$$

Note that upper and lower sub-channels carry only even and odd indexed sub-channels, respectively. After the D/A (Digital-to-Analog) conversion, amplification, up-conversion and filtering, the transmitted signal on each path is equal to $$S_U(t) = \frac{1}{\sqrt{N}} \sum_{k=0, k \text{ even}}^{N-1} d_k \cos[2\pi \cdot (f_c + f_k) \cdot t + \theta_k] \text{ and} \quad \text{Equation 5}$$

$$S_L(t) = \frac{1}{\sqrt{N}} \sum_{k=0, k \text{ odd}}^{N-1} d_k \cos[2\pi \cdot (f_c + f_k) \cdot t + \theta_k] \quad \text{Equation 6}$$

where $f_c$ and $f_k$ are the carrier frequency and the frequency of the $k^{th}$ sub-channel, respectively.

The polarization state of a transmitted signal is defined as the curve traced by the end points of the arrow representing the instantaneous electric field at a fixed location in space. The field is observed in the direction of propagation. For a plane wave traveling in the negative z direction, the instantaneous field can be written as $$E_z(z; t) = \hat{a}_x E_x \cos(\omega_c t + k \cdot z + \varphi_x) + \hat{a}_y E_y \cos(\omega_c t + k \cdot z + \varphi_y) \quad \text{Equation 7}$$

where k in this case is equal to $2\pi/\lambda$. $E_x$ and $E_y$ are the maximum amplitude of the x and the y components respectively. Without loss of generality z can be allowed to be zero, in which case $$E_z(0; t) = \hat{a}_x E_x \cos(\omega_c t + \varphi_x) + \hat{a}_y E_y \cos(\omega_c t + \varphi_y) \quad \text{Equation 8}$$

$E_x$ and $E_y$ in the present case are the electric fields radiated by the upper and lower branch of the ADPS-OFDM transmitter $$E_z(0; t) \propto \hat{a}_x \frac{1}{\sqrt{N}} \sum_{k=0, k \text{ even}}^{N-1} d_k \cos[2\pi \cdot (f_c + f_k) \cdot t + \theta_k] + \quad \text{Equation 9}$$

-continued $$\hat{a}_y \frac{1}{\sqrt{N}} \sum_{k=0, k \text{ odd}}^{N-1} d_k \cos[2\pi \cdot (f_c + f_k) \cdot t + \theta_k]$$

The above field equation demonstrates that the even indexed and odd indexed sub-channels are polarized vertically and horizontally, respectively.

Figure 6:
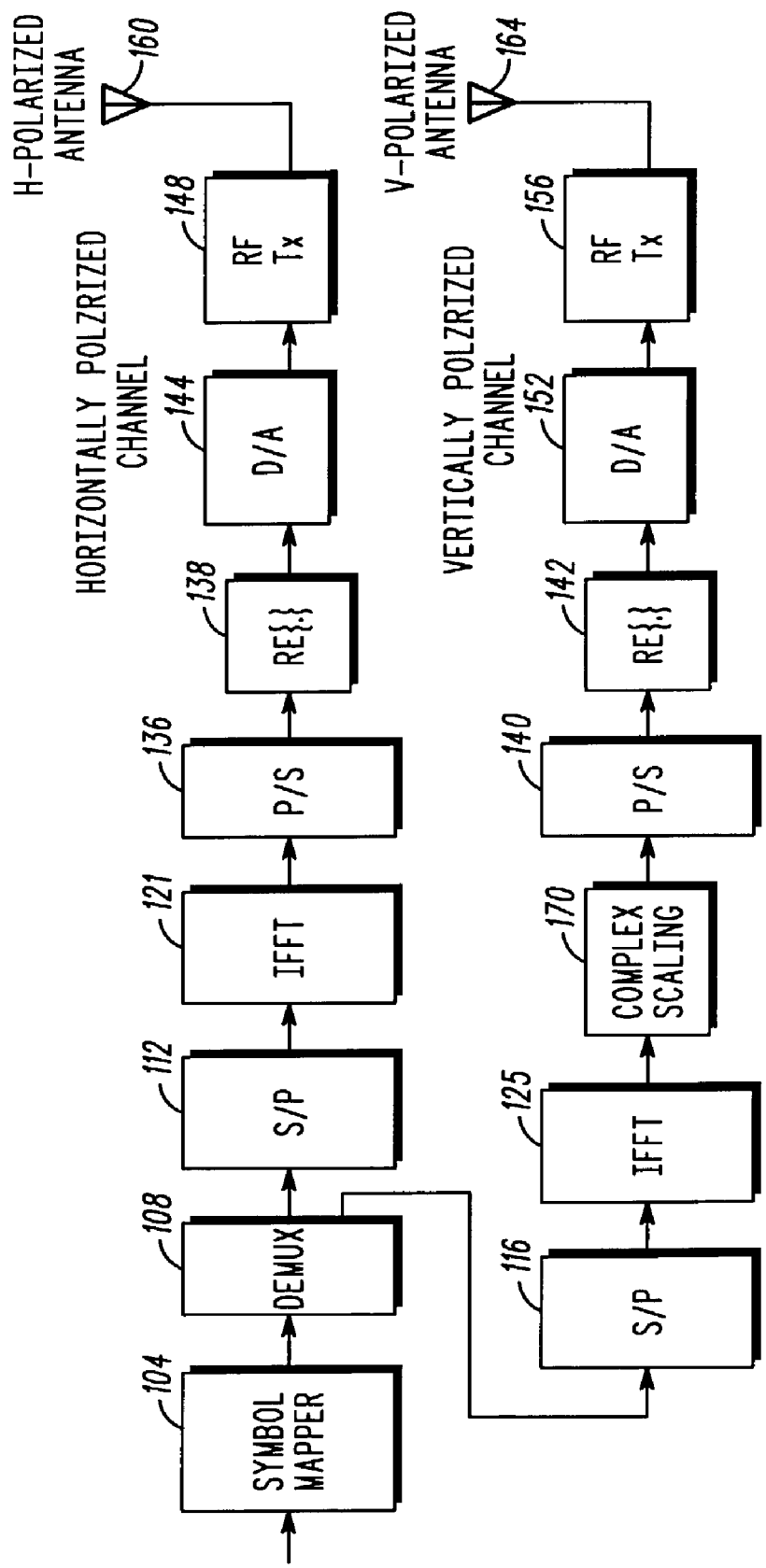
FIG. 6 is a block diagram of an efficient implementation of an illustrative Alternating Dual Polarization States (ADPS)-OFDM transmitter system consistent with certain embodiments of the present invention.

An efficient implementation of a transmitter consistent with certain embodiments of the present invention is illustrated in FIG. 6. Here, it can be demonstrated that the two N point IFFT blocks can be replaced by two (N/2) point IFFT blocks and a scaling operation. The IFFT output of upper branch is given by $$X_U(n) = \frac{1}{\sqrt{N}} \sum_{k=0}^{N-1} x'(k) e^{\frac{j \cdot 2\pi \cdot k \cdot n}{N}}. \quad \text{Equation 10}$$

Substitute k=2k' (since the odd indexed elements of x(k) are missing) and rewrite the IFFT expression:

$$X_U(n) = \frac{1}{\sqrt{N}} \sum_{k'=0}^{N/2} x(k) e^{\frac{j \cdot 2\pi \cdot k' \cdot n}{(N/2)}}. \quad \text{Equation 11}$$

This demonstrates that $X_U(n)$ can be computed by a (N/2) point FFT. Similarly, the IFFT on the lower branch is $$X_L(n) = \frac{1}{\sqrt{N}} \sum_{k=0}^{N-1} x''(k) e^{\frac{j \cdot 2\pi \cdot k \cdot n}{N}}. \quad \text{Equation 12}$$

Let k=2k'+1 (since the even indexed elements of x(k) are missing) and rewrite the IFFT $$X_L(n) = \frac{1}{\sqrt{N}} \sum_{k'=0}^{N/2} x(k) e^{\frac{j \cdot 2\pi \cdot (2k'+1) \cdot n}{N}} \quad \text{Equation 13}$$

$$= \frac{1}{\sqrt{N}} \sum_{k'=0}^{N/2} x(k) e^{\frac{j \cdot 2\pi \cdot (2k') \cdot n}{N}} e^{\frac{j 2\pi n}{N}}, \text{ Or}$$

$$X_L(n) = \frac{1}{\sqrt{N}} e^{\frac{j 2\pi n}{N}} \sum_{k'=0}^{N/2} x(k) e^{\frac{j \cdot 2\pi \cdot k' \cdot n}{(N/2)}}. \quad \text{Equation 14}$$

In other words, the lower branch N point IFFT can be replaced with a (N/2) point IFFT scaled with an exponential factor as illustrated in FIG. 6, with the complex scaling factor introduced as complex scaling block 170. IFFTs 120 and 124 are replaced with IFFTs 121 and 125 which carry out an N/2 point IFFT rather that an N point IFFT.

Figure 7:
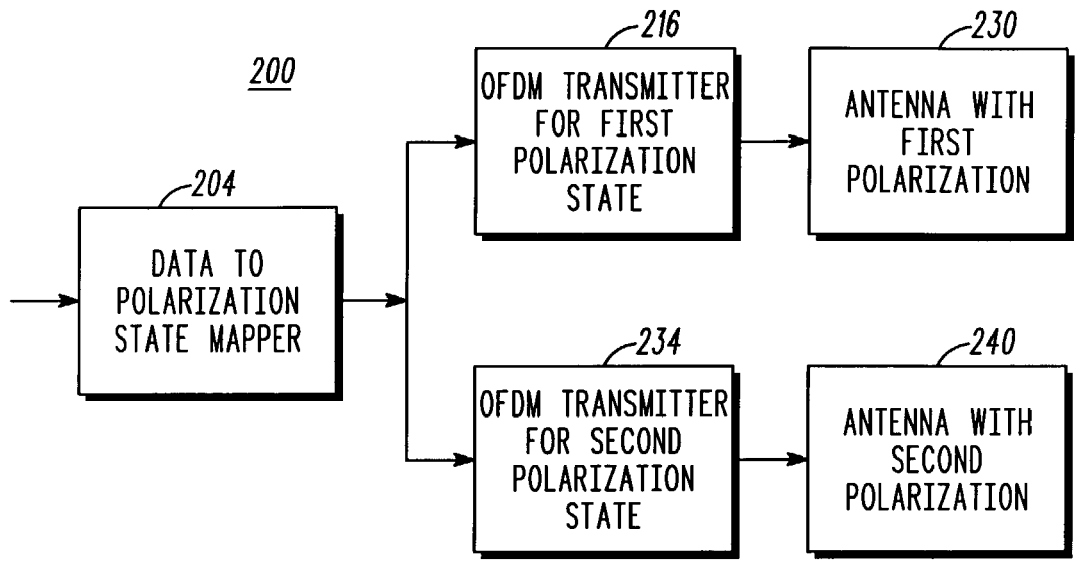
FIG. 7 is a block diagram of an (ADPS)-OFDM transmitter consistent with certain embodiments of the present invention.

FIG. 7 broadly depicts an ADPS-OFDM transmitter 200 consistent with certain embodiments of the present invention. An Orthogonal Frequency Division Multiplexer (OFDM) transmitter apparatus consistent with certain embodiments of the present invention receives data at 204 to be transmitted and maps a first portion of the data to a first polarization state and a second portion of the data to a second polarization state. A first transmitter 216 transmits the first portion of the data as a set of first OFDM subcarriers using an antenna 230 exhibiting a first polarization (e.g., horizontal). A second transmitter 234 transmits the second portion of the data as a set of second OFDM subcarriers using an antenna 240 exhibiting a second polarization (e.g., vertical), wherein the first polarization is orthogonal to the second polarization.

Figure 8:
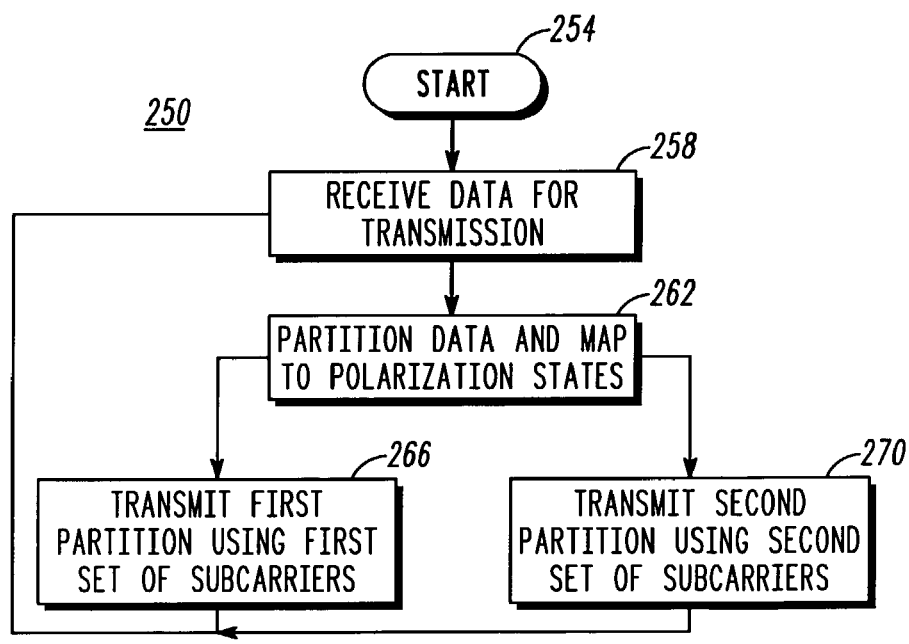
FIG. 8 is a flow chart of a transmitter method consistent with certain embodiments of the present invention.

With reference to FIG. 8, the Orthogonal Frequency Division Multiplexing (OFDM) transmitter method is depicted as process 250 starting at 254. The process starts by receiving data to be transmitted 258. The data are then partitioned and mapped so that a first portion of the data is mapped to a first polarization state and a second portion of the data to a second polarization state at 262. The first portion of the data is then transmitted at 266 as a set of first OFDM subcarriers using an antenna exhibiting a first polarization. The second portion of the data is transmitted as a set of second OFDM subcarriers using an antenna exhibiting a second polarization at 270 where the first polarization is orthogonal to the second polarization.

Figure 9:
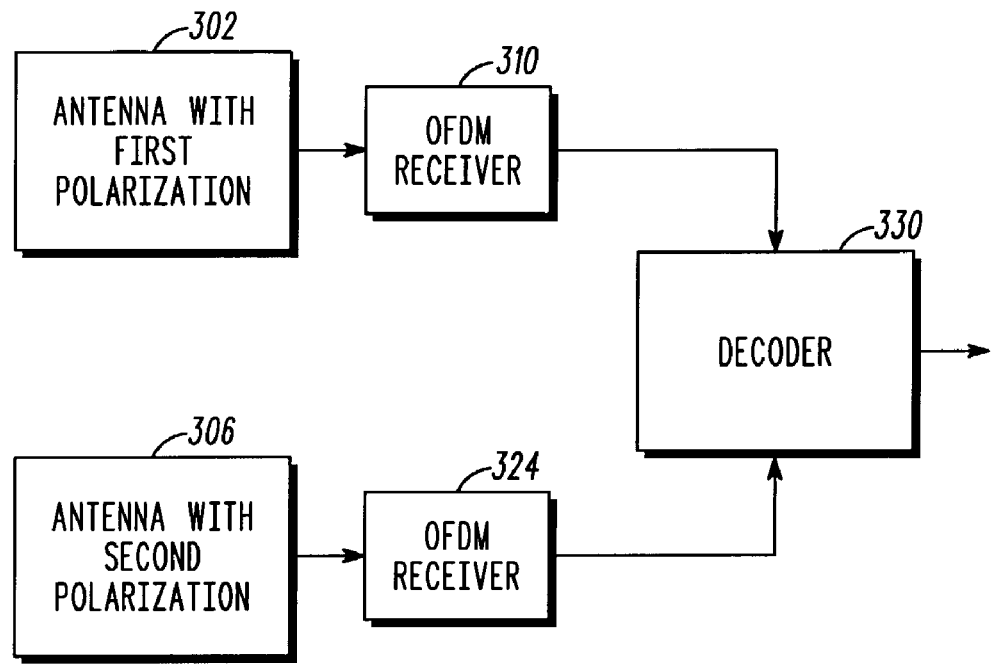
FIG. 9 is a block diagram of an (ADPS)-OFDM receiver consistent with certain embodiments of the present invention.

With reference to FIG. 9, an OFDM receiver apparatus consistent with certain embodiments of the present invention uses a first antenna 302 exhibiting the first polarization and a second antenna 306 exhibiting the second polarization. A first OFDM receiver 310 receives a first set of polarized OFDM subcarriers from the first antenna 302 while a second OFDM receiver 324 receives a second set of polarized OFDM subcarriers from the second antenna 306. A decoder 330 decodes the first and second sets of OFDM subcarriers into a stream of data.

Figure 10:
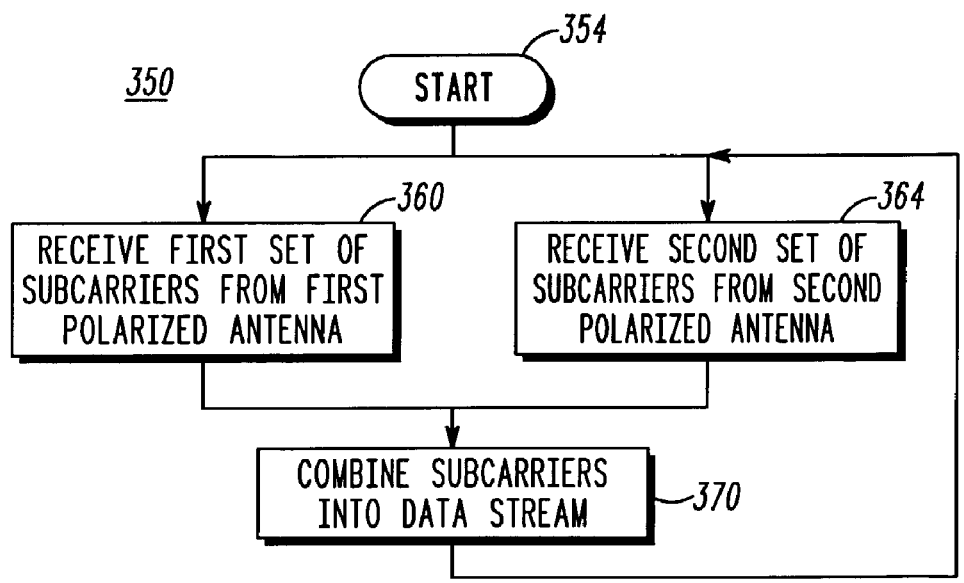
FIG. 10 is a flow chart illustrating a receiver method consistent with certain embodiments of the present invention.

An Orthogonal Frequency Division Multiplexing (OFDM) receiver method as carried out by the receiver of FIG. 9 is depicted by the flow chart 350 of FIG. 10 starting at 354. A first set of polarized OFDM subcarriers is received at 360 from a first antenna that exhibits a first polarization. A second set of polarized OFDM subcarriers is received from a second antenna that exhibits a second polarization at 364. The first polarization is orthogonal to the second polarization. The first and second sets of OFDM subcarriers are then decoded and combined into a stream of data.

Figure 11:
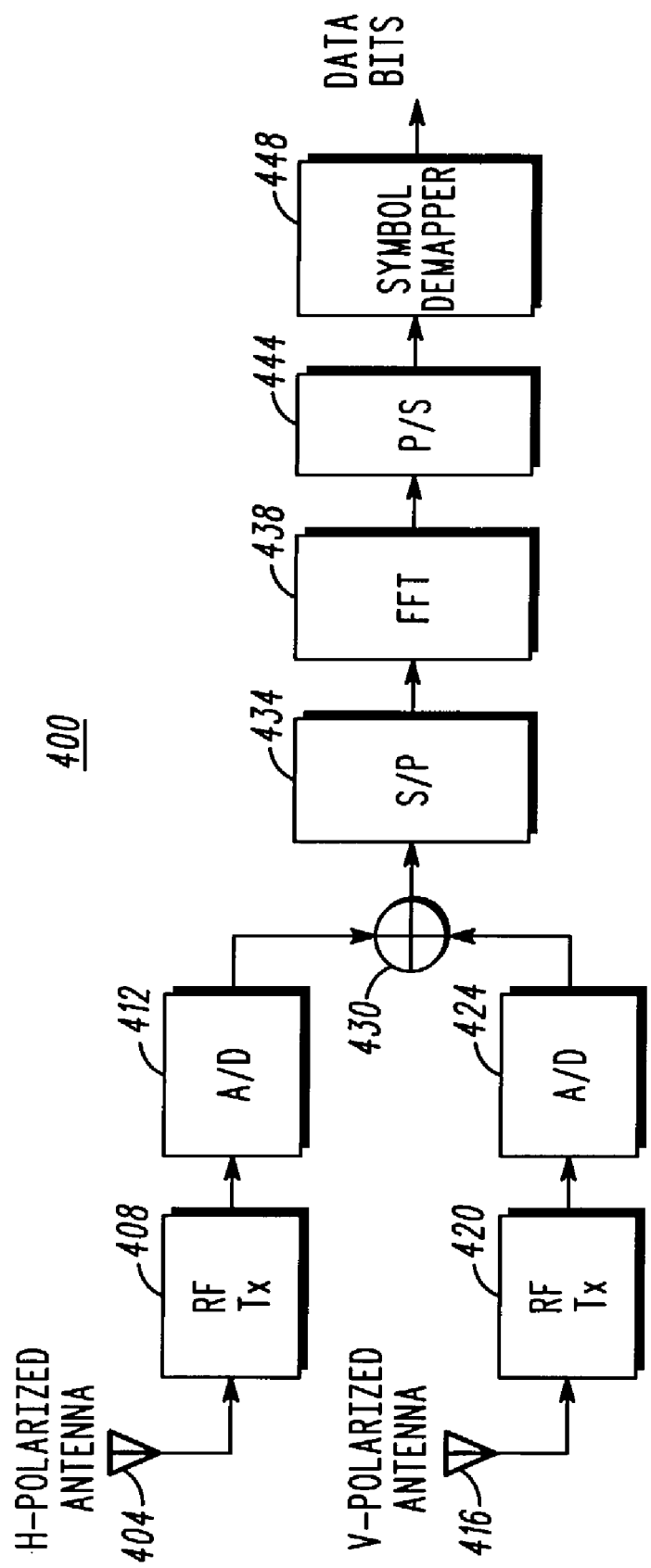
FIG. 11 is a more detailed block diagram of an (ADPS)-OFDM receiver consistent with certain embodiments of the present invention.

FIG. 11 depicts a more detailed block diagram of an ADPS-OFDM receiver 400 consistent with certain embodiments of the present invention. In receiver 400, a horizontally polarized antenna 404 receives horizontally polarized signals and passes them to an RF receiver section 408 for conversion to baseband. The baseband signal is converted to digital at A/D 412. Similarly, a vertically polarized antenna 416 receives vertically polarized signals and passes them to an RF receiver section 420 for conversion to baseband. The baseband signal is converted to digital at A/D 424. The digitized signals from 412 and 424 are combined at 430 into a single data stream which is then processed by a serial to parallel converter 434. Parallel data from the S/P 434 is provided to a Fast Fourier Transformer 438 that performs an FFT on the data. The output of the FFT 438 is then serialized into serial data representing data symbols (e.g., QAM symbols) at a parallel to serial converter 444. The data symbols are mapped to data at symbol demapper 448 to produce a stream of output data bits. Other embodiments of the present invention will occur to those skilled in the art upon consideration of the present teachings. In one exemplary case, alternating subcarriers can be polarized using alternating polarization states as depicted in FIGS. 2-4. In other embodiments, other arrangements may be suitable.

Thus, a new OFDM (Orthogonal Frequency Division Multiplexing) modulation scheme, Alternating Dual Polarization States-OFDM (ADPS-OFDM), can be implemented with a transmitter of comparable complexity to conventional OFDM transmitters. The new ADPS-OFDM has a number of advantages over the traditional Orthogonal Frequency Division Multiplexing (OFDM).

The PAPR (Peak-to-Average Power Ratio) associated with a conventional OFDM is 10 log N where N is the number of sub-carriers. The PAPR of each of the ADPS-OFDM transmitter branches is 10 log(N/2). Consequently, the PAPR (Peak-to-Average Power Ratio) of ADPS-OFDM in each branch is 3 dB lower than that of the conventional OFDM, since there are half as many sub-channels in each transmission branch. Because of a lower PAPR, less distortion is generated in the RF section of both the transmitter and the receiver, and higher efficiency can be obtained in the transmitter.

Secondly, ADPS-OFDM can utilize less expensive oscillators and frequency synthesizers since the sub-channels spacing are twice that of the conventional OFDM systems and a less accurate frequency synthesizer can be tolerated. The main impact of phase noise is the introduction of intercarrier interference (ICI). The amount of degradation in signal to noise ratio is given by $$D_{phase} \cong \frac{11}{6\ln 10} \cdot \frac{4\pi\beta}{B} \cdot \frac{E_s}{N_0}. \qquad \text{Equation 15}$$

where β, B and $E_s/N_0$ denote the −3 dB one-sided bandwidth of the power spectral density (PSD) of the carrier, subcarrier spacing and energy per symbol divided by the PSD of noise, respectively. The degradation in ADPS-OFDM is reduced by fifty percent when the subcarrier spacing is increased by a factor of two compared with conventional OFDM. In OFDM, frequency offset leads to the introduction of intercarrier interference. The amount of signal to noise ratio degradation, subject to the assumption that frequency offset is small compared to the subcarrier spacing is given by:

$$D_{freq} \cong \frac{10}{3\ln 10} \cdot \left(\frac{\pi\Delta f}{B}\right)^2 \cdot \frac{E_s}{N_0}. \qquad \text{Equation 16}$$

where Δf denotes existing frequency offset. In ADPS-OFDM the degradation due to ICI is reduced by a factor of four when the subcarrier spacing is increased by a factor of two. Thus, ADPS-OFDM can utilize less expensive oscillators.

Thirdly, since degradation in signal-to-noise ratio caused by ICI (inter-carrier Interference) is proportional to sub-carrier spacing, ADPS-OFDM is fifty percent more immune to ICI (Inter-carrier Interference) caused by Doppler spread because of the doubled sub-channel spacing.

Fourthly, an additional level of interleaving can be achieved by manipulation of the subcarriers of different polarization states. For example, as illustrated in FIG. 4, alternating subcarriers in a single OFDM symbol can be interleaved. However, additional levels of interleaving can be achieved by alternating the polarization states from OFDM symbol to OFDM symbol. Other variations can be incorporated to alter the interleaving by manipulation of time, frequency and polarization of the subcarriers and symbols.

In accordance with certain embodiments, diversity can be used to enhance performance in exchange for throughput. In such a case, for example, a first instance of an OFDM symbol can be transmitted using a first set of polarizations (e.g., HVHVHV . . . ) and a second instance of the OFDM symbol can be transmitted using a second set of polarization states (e.g., VHVHVH . . . ). Other variations will occur to those skilled in the art upon consideration of this discussion.

Although ADPS-OFDM utilizes two distinct RF paths, the multiple advantages of ADPS-OFDM over conventional OFDM (low PAPR, inexpensive frequency synthesizer requirement, resilience to ICI and enhanced interleaving) outweighs this shortcoming for many applications. Moreover, this disadvantage is likely to be minimized over time as high degrees of integration of components takes place. Also, while a conventional OFDM transmitter requires an N point IFFT, as demonstrated above, two (N/2) point IFFT are adequate for use in ADPS-OFDM. Thus, the complexity of the computations to implement ADPS-OFDM transmitter remains comparable to that of a conventional OFDM.

Although the present invention has been illustrated in terms of an OFDM system in which polarization states are used to provide the enhancement described, other modulation techniques could similarly benefit from the addition of polarization state enhancements using similar techniques. Such embodiments are contemplated hereby and are within the scope of the present invention. In such embodiments consistent with the present invention, for example and not by way of any limitation, a transmitter apparatus receives data to be transmitted and a mapper maps a first portion of the data to a first polarization state and a second portion of the data to a second polarization state. A first transmitter transmits the first portion of the data using an antenna exhibiting a first polarization while a second transmitter transmits the second portion of the data using an antenna exhibiting a second polarization. The first polarization is orthogonal or quasi-orthogonal to the second polarization.

Similarly, by way of example and not limitation, a receiver apparatus consistent with certain embodiments of the invention has a first antenna exhibiting a first polarization and a second antenna exhibiting a second polarization. A first receiver receives a first signal from the first antenna and a second receiver receives a second signal from the second antenna. A decoder receives the first and second signals from the first and second receivers and decodes the first and second signals into a stream of data. Again, the first polarization is orthogonal or quasi-orthogonal to the second polarization.

Those skilled in the art will recognize that the present invention has been described in terms of exemplary embodiments based upon use of a programmed processor such as a DSP implementing the FFT and IFFT as well as other functions. However, the invention should not be so limited, since the present invention could be implemented using hardware component equivalents such as special purpose hardware and/or dedicated processors which are equivalents to the invention as described and claimed. Similarly, general purpose computers, microprocessor based computers, microcontrollers, optical computers, analog computers, dedicated processors and/or dedicated hard wired logic may be used to construct alternative equivalent embodiments of the present invention.

Moreover, although the present invention has been explained in terms of a ADPS-OFDM system, those skilled in the art will appreciate that in light of the present discussion, a plurality (two or more) of polarization states could be used and mapped to any desired pattern of subcarriers of an OFDM system. For example, if three polarization states are represented by A, B and C, adjacent subcarriers could be mapped to these polarization states as SC0-A, SC1-B, SC2-C, SC3-A, SC4-B, SC5-C, SC6-A, etc. Other patterns can also be devised such as SC0-A, SC1-A, SC2-B, SC3-B, SC4-C, SC5-C, SC6-A, etc. without departing from the invention.

Those skilled in the art will appreciate that the program steps and associated data used to implement the embodiments described above can be implemented using any suitable electronic storage medium such as for example disc storage, Read Only Memory (ROM) devices, Random Access Memory (RAM) devices; optical storage elements, magnetic storage elements, magneto-optical storage elements, flash memory, core memory and/or other equivalent storage technologies without departing from the present invention. Such alternative storage devices should be considered equivalents.

The present invention, as described in embodiments herein, may be implemented using a programmed processor such as a DSP executing programming instructions that are broadly described above and that can be stored on any suitable electronic storage medium (e.g., disc storage, optical storage, semiconductor storage, etc.) or transmitted over any suitable electronic communication medium. However, those skilled in the art will appreciate that the processes described above can be implemented in any number of variations and in many suitable programming languages without departing from the present invention. For example, the order of certain operations carried out can often be varied, additional operations can be added or operations can be deleted without departing from the invention. Error correction can be added and/or enhanced and variations can be made in user interface and information presentation without departing from the present invention. Such variations are contemplated and considered equivalent.

While the invention has been described in conjunction with specific embodiments, it is evident that many alternatives, modifications, permutations and variations will become apparent to those of ordinary skill in the art in light of the foregoing description. Accordingly, it is intended that the present invention embrace all such alternatives, modifications and variations as fall within the scope of the appended claims.

What is claimed is:

1. An Orthogonal Frequency Division Multiplexer (OFDM) transmitter apparatus, comprising:
   N antennas having a corresponding set of N differing polarizations; and
   a transmitter comprising a corresponding set of N transmitter branches coupled to drive the set of N antennas, wherein N is an integer, and wherein the corresponding set of N transmitter branches convert a sequence of data symbols to an ordered set of OFDM subchannels having a total bandwidth that is transmitted in a frequency band having the total bandwidth, wherein members of each pair of adjacent OFDM subchannels in the ordered set of OFDM subchannels are transmitted by different antennas of the set of N antennas.

2. The OFDM apparatus according to claim 1, wherein N equals two and the set of polarizations consists of horizontal polarization and a vertical polarization.

3. The OFDM apparatus according to claim 1, wherein members of the ordered set of OFDM sub-channels are transmitted simultaneously.

4. The OFDM apparatus according to claim 1, wherein at least two members of the ordered set of OFDM sub-channels are transmitted at different times.

5. An Orthogonal Frequency Division Multiplexer (OFDM) transmitter apparatus, comprising:
   a mapper that generates two data symbol sequences from a data symbol sequence source, wherein a first data symbol sequence comprises alternate data symbols selected from the data symbol source that are interleaved with null symbols that replace non-selected data symbols, and wherein a second data symbol sequence comprises the non-selected data symbols interleaved with null symbols that replace the selected data symbols;

a first transmitter branch that generates a first set of OFDM subcarriers from the first data symbol sequence;

a second transmitter branch that generates a second set of OFDM subcarriers from the second data symbol sequence;

a first RF transmitter that modulates the first set of OFDM subcarriers and transmits the modulated subcarriers as a first set of OFDM subchannels in a frequency band, using a first antenna exhibiting a first polarization; and a second RF transmitter that modulates the second set of OFDM subcarriers and transmits the modulated subcarriers as a second set of OFDM subchannels in a frequency band, using a second antenna exhibiting a second polarization, wherein the first polarization is different than the second polarization.

6. The OFDM apparatus according to claim 5, wherein the set of polarizations consists of horizontal polarization and a vertical polarization.

7. The OFDM apparatus according to claim 5, wherein members of the ordered set of OFDM sub-channels are transmitted simultaneously.

8. The OFDM apparatus according to claim 5, wherein at least two members of the ordered set of OFDM sub-channels are transmitted at different times.

9. An Orthogonal Frequency Division Multiplexer (OFDM) transmitter apparatus, comprising:

a mapper that generates a set of N data symbol sequences from a data symbol sequence source, wherein each data symbol sequence comprises a unique subset of data symbols selected from the data symbol source that are interleaved with null symbols that replace non-selected data symbols;

a set of N corresponding transmitter branches, each corresponding transmitter branch generating a set of corresponding OFDM subcarriers from a corresponding one of the set of N data symbol sequences;

a set of N corresponding RF transmitters, each corresponding RF transmitter modulating one of the set of corresponding OFDM subcarriers and transmitting the modulated one of the set of corresponding OFDM subcarriers as one of a set of corresponding OFDM subchannels in a frequency band, using one of a set of corresponding antennas, wherein each antenna in the set of corresponding antennas exhibits a unique polarization, and wherein N is an integer.

* * * * *